United States Patent
Iwata

(10) Patent No.: US 11,658,848 B2
(45) Date of Patent: May 23, 2023

(54) COMMUNICATION SYSTEM AND METHOD OF CHANGING A SETTING

(71) Applicant: NEC Corporation, Tokyo (JP)

(72) Inventor: Hajime Iwata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/272,380

(22) PCT Filed: Sep. 3, 2019

(86) PCT No.: PCT/JP2019/034552
§ 371 (c)(1),
(2) Date: Mar. 1, 2021

(87) PCT Pub. No.: WO2020/050243
PCT Pub. Date: Mar. 12, 2020

(65) Prior Publication Data
US 2021/0328833 A1      Oct. 21, 2021

(30) Foreign Application Priority Data
Sep. 3, 2018    (JP) .............................. JP2018-164224

(51) Int. Cl.
*H04L 12/46* (2006.01)
*H04L 41/0816* (2022.01)
*H04L 9/40* (2022.01)

(52) U.S. Cl.
CPC ...... *H04L 12/4675* (2013.01); *H04L 41/0816* (2013.01); *H04L 63/0428* (2013.01)

(58) Field of Classification Search
CPC . H04L 12/4675; H04L 12/22; H04L 41/0816; H04L 41/0695; H04L 41/22;
(Continued)

(56) References Cited

U.S. PATENT DOCUMENTS

| | | | | |
|---|---|---|---|---|
| 6,058,419 A | * | 5/2000 | Taniguchi | ............ H04Q 3/0062 709/248 |
| 6,751,660 B1 | * | 6/2004 | Mansingh | ............... H04L 49/15 709/224 |

(Continued)

FOREIGN PATENT DOCUMENTS

| | | | | |
|---|---|---|---|---|
| JP | 2006166028 | A | * | 6/2006 |
| JP | 3913249 | B2 | | 5/2007 |

(Continued)

OTHER PUBLICATIONS

International Search Report for PCT Application No. PCT/JP2019/034552, dated Oct. 8, 2019.
(Continued)

*Primary Examiner* — Alina A Boutah

(57) ABSTRACT

A communication system comprises a plurality of network elements and a management apparatus. Each of the network elements transfers a data signal. The management apparatus manages a line service provided by a network element as management object among the plurality of network elements. The management apparatus generates an authentication code corresponding to the network element as management object and notifies the generated authentication code to the network element as management object. The network element as management object, using the notified authentication code, judges whether or not to accept a change concerning the line service of the own network element.

20 Claims, 15 Drawing Sheets

(58) Field of Classification Search
CPC .............. H04L 63/0428; H04L 63/083; H04L 43/0823
See application file for complete search history.

(56) References Cited

U.S. PATENT DOCUMENTS

| | | | |
|---|---|---|---|
| 7,681,037 B2 * | 3/2010 | Yoshida | H04L 63/08 713/153 |
| 2003/0012142 A1 * | 1/2003 | Nagahama | H04J 3/085 370/250 |
| 2003/0177205 A1 * | 9/2003 | Liang | H04L 41/22 709/223 |
| 2005/0122967 A1 * | 6/2005 | Nagasawa | H04Q 3/0062 370/380 |
| 2008/0244716 A1 * | 10/2008 | Goto | H04L 63/10 726/5 |
| 2011/0016202 A1 * | 1/2011 | Ye | H04L 41/044 709/222 |
| 2021/0200557 A1 * | 7/2021 | Coelho | H04L 67/34 |

FOREIGN PATENT DOCUMENTS

| | | |
|---|---|---|
| JP | 2015-095778 A | 5/2015 |
| JP | 2015-154301 A | 8/2015 |
| JP | 2016-213544 A | 12/2016 |
| JP | 2017-135545 A | 8/2017 |
| WO | 2004/051928 A1 | 6/2004 |
| WO | WO-2004051928 A1 * | 6/2004 ............ H04L 41/00 |

OTHER PUBLICATIONS

J. Case et al., A Simple Network Management Protocol (SNMP) IETF RFC 1157, May 1990.

* cited by examiner

FIG. 6

NE INFORMATION TABLE (NMS30-1)

| NE NAME | IP ADDRESS | SETTING FILE ENCRYPTION KEY |
|---|---|---|
| NE10-1 | xxx.yyy.zzz.1 | 1122 |
| ... | ... | ... |
| NE10-N | xxx.yyy.zzz.n | NN33 |

FIG. 7

LINE SERVICE SETTING TABLE (NMS30-1)

| LINE SERVICE NAME | NE NAME | AID TYPE | FROM AID | TO AID | ... | NE SETTING | AUTHENTI-CATION CODE |
|---|---|---|---|---|---|---|---|
| SERVICE 1 | NE10-1 | VC12 | 1-1-1-1-1 | 2-1-1-1-1 | ... | COMPLETED | |
| | NE10-3 | VC12 | 1-1-1-1-1 | 3-1-1-1-1 | ... | COMPLETED | 1234 |
| SERVICE 2 | NE10-4 | VC12 | 2-1-1-1-1 | 3-1-1-1-2 | ... | UNSET | |
| | NE10-1 | VC12 | 1-1-1-1-2 | 2-1-1-1-2 | ... | UNSET | |
| | NE10-2 | VC12 | 1-1-1-1-1 | 2-1-1-1-1 | ... | UNSET | |
| SERVICE N | NE10-1 | VC12 | 3-1-1-1-1 | 2-1-1-1-3 | ... | UNSET | |
| | NE10-3 | VC12 | 2-1-1-1-1 | 4-1-1-1-1 | ... | UNSET | |

LINE SERVICE SETTING

FIG. 8

| LINE SERVICE NAME | AID TYPE | FROM AID | TO AID | ... | AUTHENTI-CATION CODE |
|---|---|---|---|---|---|
| SERVICE 1 | VC12 | 1-1-1-1-1 | 2-1-1-1-1 | ... | 1234 |
| SERVICE 2 | VC12 | 1-1-1-1-2 | 2-1-1-1-2 | ... | 5678 |
| | | | | | |
| SERVICE N | VC12 | 3-1-1-1-1 | 2-1-1-1-3 | ... | EFGH |

LINE SERVICE TABLE (NE10-1)

COMMUNICATION SYSTEM AND METHOD OF CHANGING A SETTING

CROSS-REFERENCE TO RELATED APPLICATIONS

This application is a National Stage Entry of PCT/JP2019/034552 filed on Sep. 3, 2019, which claims priority from Japanese Patent Application 2018-164224 filed on Sep. 3, 2018, the contents of all of which are incorporated herein by reference, in their entirety.

FIELD

The present invention relates to a communication system and a method of changing a setting.

BACKGROUND

In order to realize transmission and reception of data between terminals in a communication system configured by a plurality of network elements (NE; Network Element), a line service between the terminals is set. The line service is identified by a line service identifier (for example, VLAN ID; Virtual Local Area Network Identifier) and needs to satisfy the following conditions.

First, a data signal (packet) is brought from a sending terminal to a receiving terminal by being transferred by a plurality of relay NEs using a line service.

Second, each of the relay NEs identifies a line service using an identifier and transfers a data signal.

The above conditions impose the following two requirements to a setting of a line service in a communication system which provides a line service.

The first requirement is that different line services passing through the same NE use different identifiers.

The second requirement is that a plurality of NEs which provide the same line service identify the line service concerned using a common value.

In general, a network management system (NMS; Network Management System) is often used in order to unitarily manage settings concerning a plurality of NEs. A communication system in which line services can be freely set from a plurality of NMSs or local craft terminals (LCT; Local Craft Terminal) needs sufficient communication between maintainers who handle their respective NMSs or LCTs.

If there is no sufficient communication between maintainers, line services inconsistent with one another in the whole system are easily set. As a result, such a problem that a data signal is not correctly transmitted could occur (refer to FIGS. 14A to 14C). Referring to FIGS. 14A to 14C, NMS1 sets a line service 1 as shown in FIG. 14A. NMS2 sets a line service 2 as shown in FIG. 14B. Setting line services in this way makes it impossible to transfer a data signal correctly because, as shown in FIG. 14C, different line services are recognized as the same line service in NE3.

There is a technique disclosed in Patent Literature (PLT) 1 as an art preventing such inconsistency. In Patent Literature 1, a problem that inconsistency between settings in the whole system is caused if NMS(s), LCT(s) in each layer are allowed to freely set a cross connection(s) is solved by giving an authority for changing, deleting a setting of the cross connection only to NMS which generated the cross connection. Namely, the art disclosed in patent Literature 1 solves the above problem by forbidding the other NMSs, LCTs to handle the cross connection.

Further, in Patent Literature 1, a function of transferring a setting authority of a cross connection to a lower NMS or LCT from an upper NMS is provided. In Patent Literature 1, proper authority management is achieved by this authority transfer function, and information on NMS, LCT having an authority concerning the cross connection is retained in a direct form in cross connection entries on data bases (DB; Data Base) of NMS and NE.

Moreover, the above-mentioned authority transfer exchanges control massages between NMS and NE via a data communication network (DCN; Data Communication Network) under control from NMS, thereby achieving rewriting of authority information in a cross connection entry on a data base of NE.

[PTL 1] Japanese Patent Publication No. 3913249 B

SUMMARY

The disclosure of the above citation is hereby incorporated by reference into this application. The following analysis is given by the inventor of the present invention.

As mentioned above, NMS is used in order to unitarily manage settings of a plurality of NEs. However, in a system in which line services can be set freely from a plurality of NMSs or LCTs, it becomes difficult to manage settings of line services without inconsistency in the whole system.

There is an art disclosed in PTL 1 as a system preventing inconsistency in the whole system. However, even in the case of the art of PTL 1, it becomes impossible to perform a setting change from NMS if a failure occurs in DCN, and in addition thereto, an authority transfer in order that LCT takes over a setting cannot be done. Accordingly, a problem may occur that a setting of a line service cannot be changed at all until a DCN failure is recovered. That is, if, in PTL 1, an exchange of a control message between NMS and NE is hindered due to a DCN failure, the following problems may occur.

First, an exchange of a control massage necessary for a setting of a line service from NMS cannot be performed. As a result, a setting instruction of a line 100 service from NMS to NE cannot be done.

Second, an exchange of a control massage for transferring a setting authority from NMS to LCT cannot be performed. As a result, a setting authority of a line service is not transferred to LCT.

Third, due to the aforementioned first and second problems, there is no measure for changing a line service while a failure is occurring in DCN, unless a setting authority of a line service is transferred to LCT in a normal circumstance.

As to the above problem occurring in PTL 1, a line quality varies along with time in a radio communication network, as a result of which communication disconnection (failure) of DCN for management occurs frequently and it is not infrequent that a failure continues for a long time (refer to FIG. 15). Accordingly, in a radio communication network, a period during which it is impossible to manage or control NE from NMS is generated. Further, due to a failure in DCN, it becomes necessary that a setting of NE which cannot communicate with NMS is changed from LCT instead thereof, whereby the technique disclosed in PTL 1 cannot be applied to a radio communication network.

The present invention mainly aims to provide a communication system and a method of changing a setting, which contribute to a change concerning a line service being made possible without generation of setting inconsistency when a failure in management and control network occurs.

According to a first aspect of the present invention or the present disclosure, provided is a communication system, comprising a plurality of network elements (transmission apparatuses), each of which is configured to transfer a data signal(s), and a management apparatus configured to manage a line service provided by a network element as management object (i.e. a network element to be managed) among the plurality of network elements. The management apparatus is configured to generate an authentication code corresponding to the network element as management object and notify the generated authentication code to the network element as management object. The network element as management object is configured to judge, by using the notified authentication code, whether or not to accept a change concerning a line service of the own apparatus (i.e. own network element or own NE).

According to a second aspect of the present invention or the present disclosure, provided is a method of changing a setting in a communication system comprising a plurality of network elements, each of which transfers a data signal(s), and a management apparatus that manages a line service provided by a network element as management object among the plurality of network elements, wherein the method comprises: generating an authentication code corresponding to the network element as management object and notifying the generated authentication code to the network element as management object, and judging, by using the notified authentication code, whether or not to accept a change concerning a line service.

According to each aspect of the present invention or the present disclosure, there are provided a communication system and a method of changing a setting, which contribute to a change concerning a line service being made possible without generation of setting inconsistency when a failure in management and control network occurs. That is, the present invention converts the communication system stated in the background art into ones that can perform a setting concerning NE thereof without inconsistency.

BRIEF DESCRIPTION OF DRAWINGS

FIG. 6 is a diagram illustrating a NE information table.

FIG. 7 is a diagram illustrating a line service table which NMS retains.

FIG. 8 is a diagram illustrating a line service table which NE retains.

PREFERRED MODES

First, an outline of an example embodiment will be described. It is to be noted that reference symbols added to this outline are added to individual elements for convenience, as an example for aiding understanding, and the disclosure of this outline does not intend any limitations. Further, connection lines between blocks in the individual figures include both bidirectional and unidirectional ones. A unidirectional arrow schematically shows a flow of a main signal (data) but does not exclude bidirectionality. Furthermore, in a circuit diagram, a block diagram, an internal configuration diagram, a connection diagram etc., an input port and an output port are present at an input end and an output end, respectively, of each connection line, although explicit representation thereof is omitted. The same applies to an input/output interface. A program is executed via a computer apparatus, which is provided with, e.g., a processor, a memory, an input device, a communication interface, and, as required, a display. A computer apparatus is configured to be communicatable regardless of a wire or wireless manner with an appliance(s) (including a computer) inside or outside the same via a communication interface. Moreover, in the following description, "A and/or B" is used to mean A and B, or, at least one of A or B.

Figure 1:
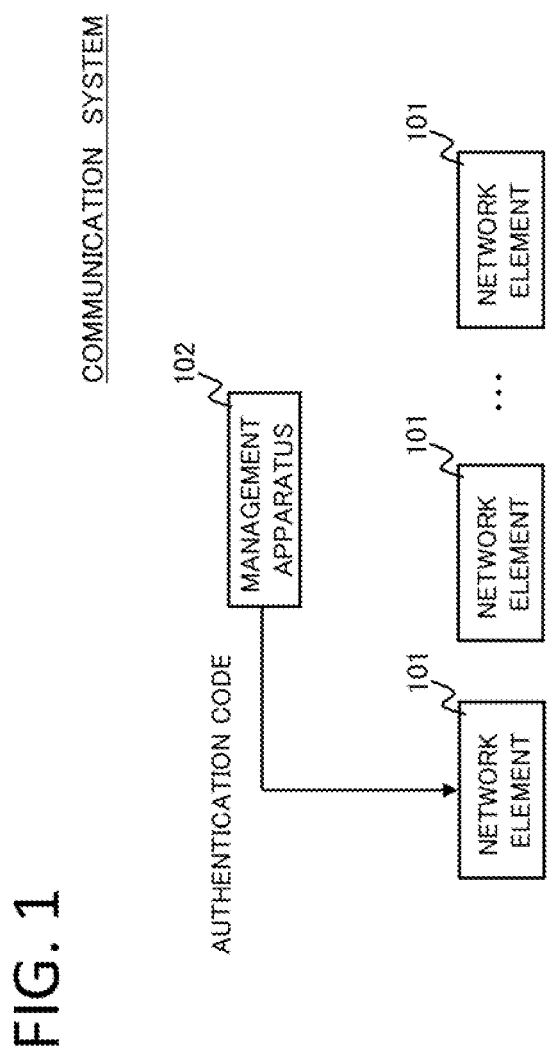
FIG. 1 is a diagram illustrating an outline of an example embodiment.

A communication system according to an example embodiment comprises a plurality of network elements (NEs, transmission apparatuses) 101 and a management apparatus 102 (refer to FIG. 1). Each of the plurality of network elements 101 transfers a data signal. The management apparatus 102 manages a line service provided by a network element 101 as management object (a network element to be managed) among the plurality of network elements 101. The management apparatus 102 generates an authentication code corresponding to the network element 101 as management object and notifies the generated authentication code to the network element 101 as management object. The network element 101 as management object judges, by using the notified authentication code, whether or not to accept a change concerning a line service of the own apparatus (own network element).

In the above communication system, an authentication code is set to a network element 101 which provides a line service. On the basis of this, the communication system uses the authentication code between the management apparatus 102 and the network element 101 to manage a change authority of a line service in the network element 101. As a result, inconsistency of a line service setting(s) in the whole system is prevented. For example, where a failure occurs in a data communication network (a monitoring control network) which connects a network element 101 and a management apparatus 102, a setting file containing an authentication code indicating presence or absence of a change authority of a line service is inputted directly into the network element 101. The network element 101 grasps that the setting file has been generated by a management apparatus 102 having a change authority and accepts a change of a line service by the setting file. In contrast, having judged that an apparatus which generated the obtained setting file did not have a valid authority, the network element 101 denies a change of a line service by the setting file. Accordingly, a change concerning a line service can be achieved without causing inconsistency of settings, even if a failure occurs in a data communication network.

Below, concrete example embodiments will be described in further detail in reference to the Drawings. It is to be noted that in each example embodiment the same reference sign is assigned to the same element, the explanation of which is omitted.

First Example Embodiment

A first example embodiment will be described in more detail using the Drawings.

Figure 2:
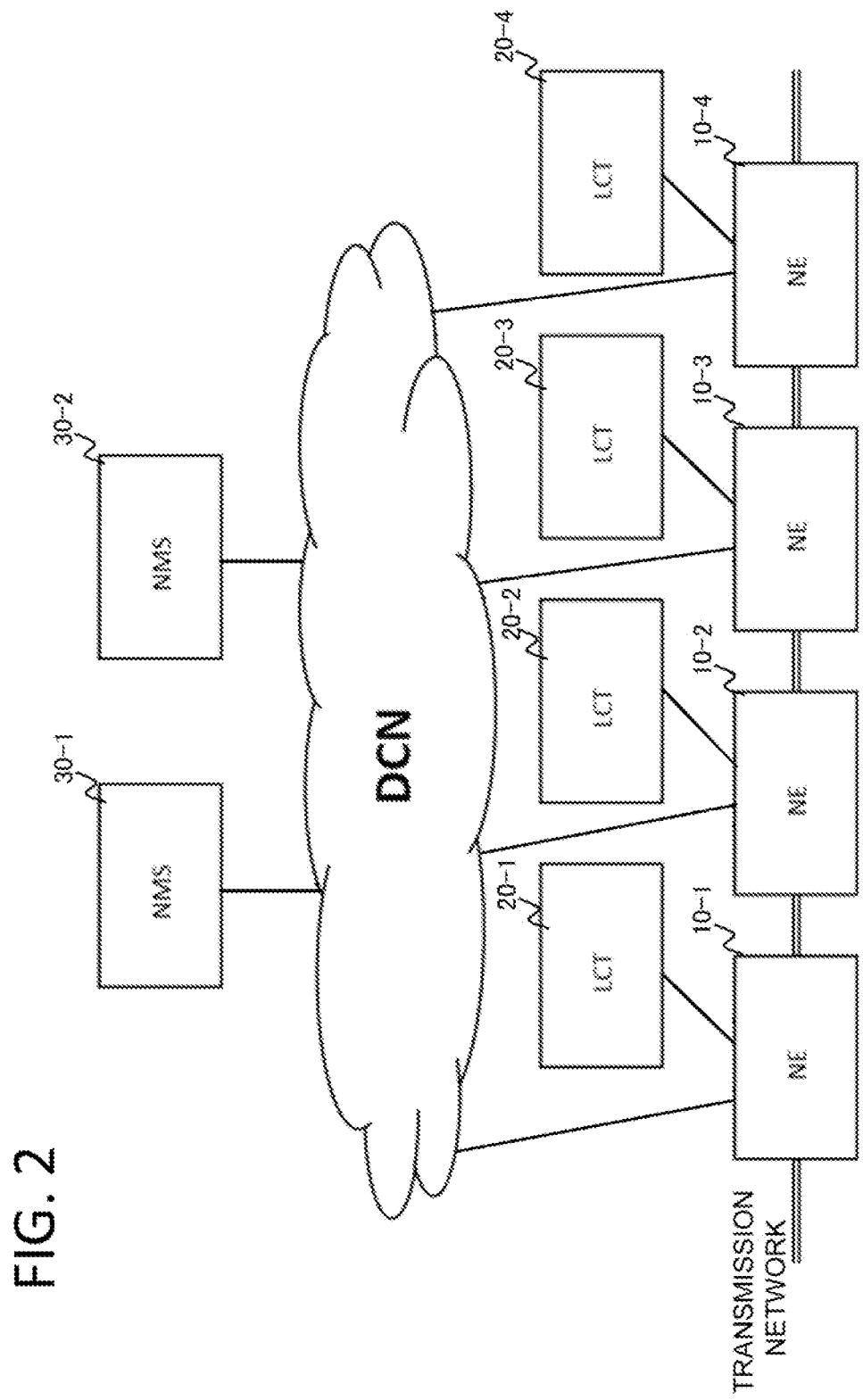
FIG. 2 is a schematic configuration of a communication system according to a first example embodiment.

FIG. 2 is a diagram illustrating a schematic configuration of a communication system according to the first example embodiment. Referring to FIG. 2, the communication system comprises (is configured by including) a plurality of NEs 10-1 to 10-4, a plurality of LCTs 20-1 to 20-4 and a plurality of NMSs 30-1 and 30-2.

It is to be noted that in the following description in cases where there is no special reason to distinguish NEs (network elements) 10-1 to 10-4, they will be denoted merely as "NE 10". The same applies to other elements, i.e. these elements are represented by the numbers written on the left side of the hyphen.

The configuration of the communication system shown in FIG. 2 is an example and thus does not intend to limit a configuration of the system. For example, although FIG. 2 shows four NEs 10, the number of NEs 10 can be N (N is a positive integer. The same applies hereinafter). Likewise, the number of NMSs 30 is not limited to two and can be an arbitrary number greater than or equal to two.

A plurality of NEs 10 formulate a communication network. Each of the plurality of NEs 10 transfers a data signal.

LCT 20 is directly connected with NE 10.

NMS 30 is connected with NE 10 via DCN (data communication network). NMS 30 is a management apparatus which manages a line service provided by NE 10 to be managed by the own apparatus (own NE) among a plurality of NEs 10. NMS 30 performs new setting of s line service, setting change of a line service, deletion of a line service etc. provided by NE 10 as management object. NMS 30 generates an authentication code corresponding to NE 10 as management object and notifies the generated authentication code to the NE 10 as management object. NE 10 judges, using the notified authentication code, whether or not to accept a change (setting change, deletion of setting) concerning a line service of the own apparatus (own NE). Details of an authentication code etc. will be described below.

In general, NMS 30 is provided in a data center and used for central management of a NE group (a plurality of NEs 10). On the other hand, LCT 20 is provided in the same station as NE 10 and used for operation in the station. LCT 20 is an apparatus provided in a station for controlling a corresponding NE 10.

<Configuration of NMS>

Figure 3:
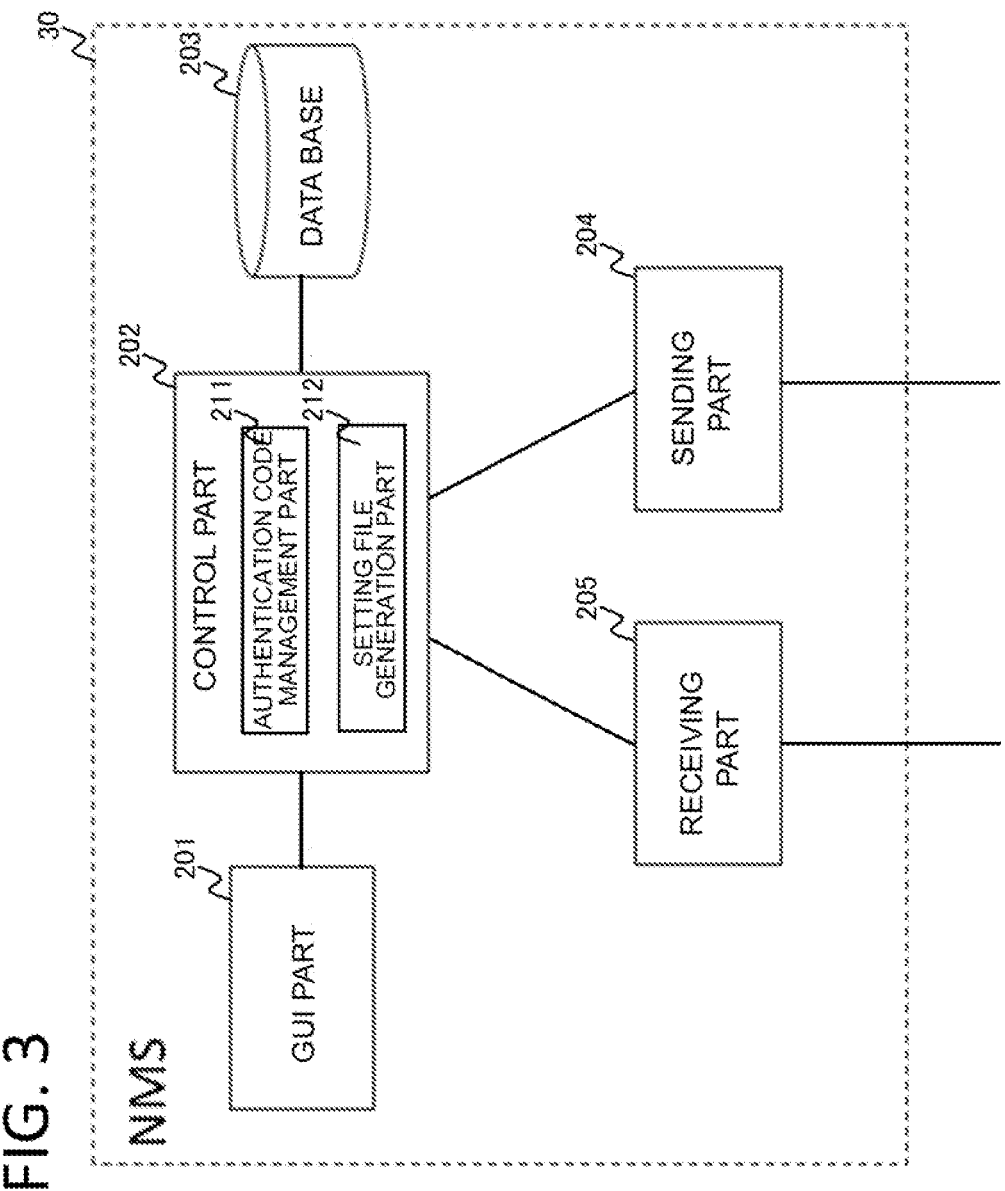
FIG. 3 is a processing configuration of NMS according to the first example embodiment.

FIG. 3 is a diagram illustrating a processing configuration of NMS 30 according to the first example embodiment. Referring to FIG. 3, the NMS 30 is configured by including a GUI (Graphical User Interface) part 201, a control part 202, a data base 203, a sending part 204 and a receiving part 205.

The GUI part 201 is a measure configured to provide information to a maintainer (an operator) or produce an interface via which a maintainer inputs information.

The control part 202 is a measure configured to control the whole NMS 30. Further, the control part 202 is a measure configured to achieve function(s) of the NMS 30.

The data base 203 stores information necessary for operation(s) of the NMS 30.

The NMS 30 communicates with NE 10 using the sending part 204 and the receiving part 205.

The control part 202 is configured to be able to exchange a control message(s) with NE 10 using the sending part 204 and the receiving part 205 connected therewith via DCN. Further, the control part 202 comprises an authentication code management part 211 and a setting file generation part 212.

The authentication code management part 211 is a measure configured to manage an authentication code necessary for a line service setting. The setting file generation part 212 is a measure configured to generate a setting file to be set to NE 10 (a line service setting file).

Details of information stored in the data base 203 and the sub modules (the authentication code management part 211 and the setting file generation part 212) of the control part 202 will be described below.

<Configuration of NE>

Figure 4:
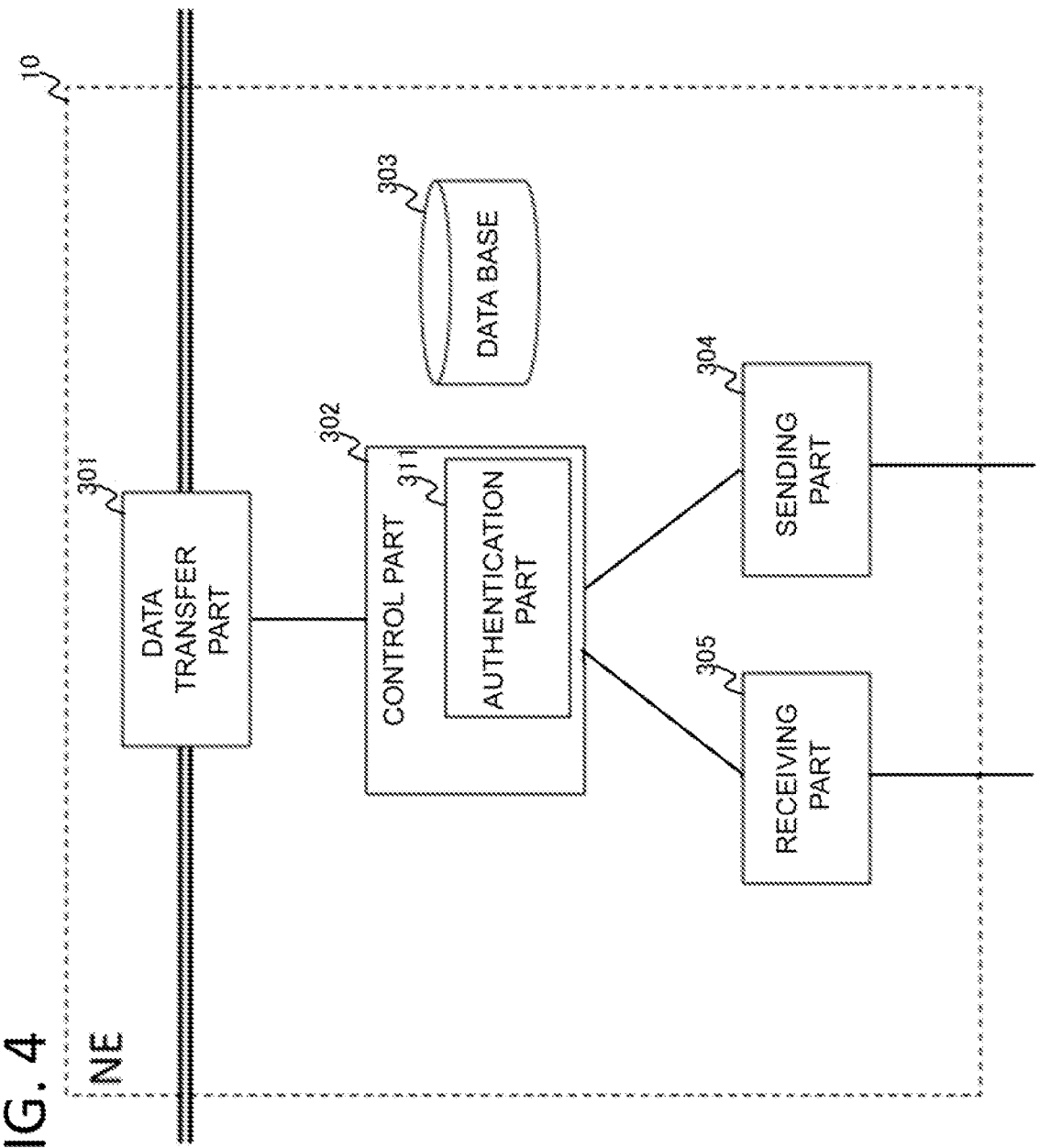
FIG. 4 is a processing configuration of NE according to the first example embodiment.

FIG. 4 is a diagram illustrating a processing configuration of NE 10 according to the first example embodiment. Referring to FIG. 4, the NE 10 is configured by including a data transfer part 301, a control part 302, a data base 303, a sending part 304 and a receiving part 305.

The data transfer part 301 is a measure configured to be connected to a plurality of transmission paths and transfer a data signal(s) according to a definition (setting) of a line service set in the data transfer part 301.

The control part 302 is a measure configured to control the whole NE 10. Further, the control part 302 is a measure configured to achieve function(s) of the NE 10.

The data base 303 stores information necessary for operation(s) of the NE 10 etc.

The sending part 304 and the receiving part 305 are connected with NMS 30 and LCT 20.

The control part 302 is configured to be able to exchange a control message(s) with NMS 30, LCT 20 via the sending part 304 and the receiving part 305.

Further, the control part 302 comprises an authentication part 311 which performs authentication of a line service setting. Details of information stored in the data base 303 and the authentication part 311 will be described below.

<Configuration of LCT>

Figure 5:
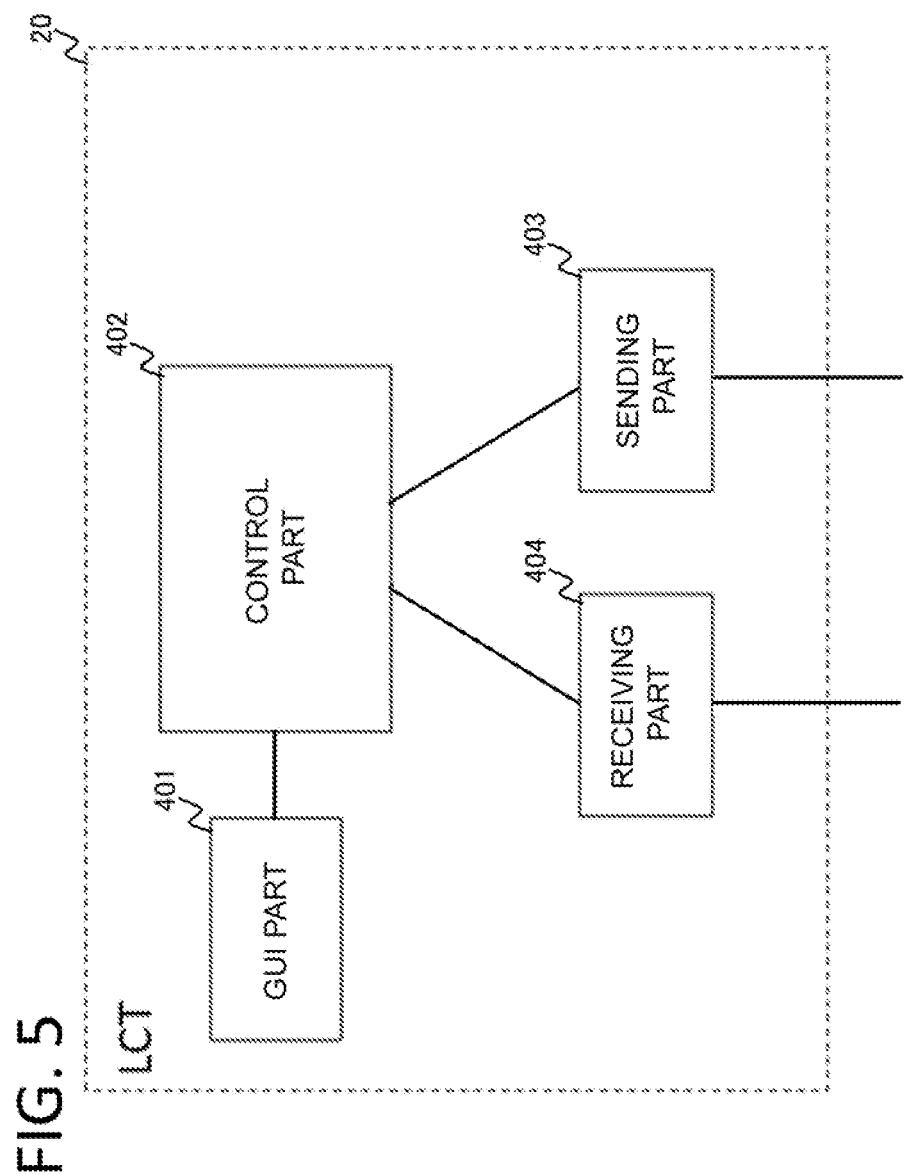
FIG. 5 is a processing configuration of LCT according to the first example embodiment.

FIG. 5 is a diagram illustrating a processing configuration of LCT 20 according to the first example embodiment. Referring to FIG. 5, the LCT 20 is configured by including a GUI part 401, a control part 402, a sending part 403 and a receiving part 404.

The GUI part 401 is a measure configured to provide information to a maintainer or produce an interface via which a maintainer inputs information.

The control part 402 is a measure configured to control the whole LCT 20. Further, the control part 402 is a measure configured to achieve function(s) of the LCT 20.

The sending part 403 and the receiving part 404 are connected with NE 10.

The control part 402 is configured to be able to exchange a control message(s) with NE 10 via the sending part 403 and the receiving part 404.

<Data base of NMS>

The data base 203 contained in the NMS 30 retains a NE information table and a line service table. The NE information table retains information about NEs 10 constituting the communication system (names and IP (Internet protocol) addresses of NEs 10) and a setting file encryption keys for the NEs 10 (refer to FIG. 6; FIG. 6 shows a NE information table the NMS 30-1 retains).

How to use a setting file encryption key will be described below. The setting file encryption key is used when a line service setting file for the corresponding NE 10 is outputted to the outside. For instance in an example shown in FIG. 6, a line service setting file for NE 10-1 is generated and the setting file is encrypted using an encryption key of "1122" upon output to the outside.

It is to be noted that FIG. 6 etc. exemplifies a 4-digit encryption key but actually a higher-order (digit) key(s) is(are) used. For example, a setting file encryption key is a key of a common key encryption. A system manager etc. distributes (inputs) in advance setting file encryption keys for individual NEs 10 to each NMS 30. Further, the setting file encryption keys are distributed in advance to the corresponding NEs 10.

A line service table is a table including a NE setting field and an authentication code field in addition to information which NMS(s) 30 in a previously known communication system (e.g. a cross connection system) retain(s). FIG. 7 is a diagram illustrating a line service table NMS 30-1 retains.

Referring to FIG. 7, information about fields of a line service name, a NE name and a line service setting is information used in a previously known system. The line service setting is information determined according to a type provided by the communication system etc., contents of which vary with line services. For example, information concerning an access ID (Access ID) etc. is retained as the line service setting. The individual NEs 10 included in the communication system conduct data transfer (packet transfer) according to contents of the line service settings.

In the data base 203 of the NMS 30, entries concerning a plurality of line services are stored. Further, each line service (transmission path) is realized by a plurality of NEs 10, and an entry of each line service includes a line service setting concerning each of a plurality of NEs 10.

The data base 203 retains an authentication code for each line service entry in addition to items (a line service name, a NE name and a line service setting) which a previously known NMS stores in its data base.

Further, the data base 203 includes information concerning a NE setting condition for each line service setting of NE 10 and manages whether or not it is completed to provide a line service setting(s) to NE(s) 10. The NMS 30 manages the above-mentioned setting condition (NE setting completed, NE unset) by a NE setting field.

<Data Base of NE>

The data base 303 included in the NE 10 retains the setting file encryption key and a line service table. As mentioned above, the setting file encryption keys are distributed in advance to the respective NEs 10. For example, a key identical to the setting file encryption key "1122" stored in the data base 203 of the NMS 30 is distributed to the NE 10-1.

The line service table retains line service names, line service settings and authentication codes of line services in which the own apparatus (own network element) is involved. FIG. 8 is a diagram illustrating a line service table retained in NE 10-1.

The disclosure of the present application, if an authentication code in a line service entry that a data base 203 of NMS 30 retains coincides with an authentication code in a line service setting that a data base 303 of NE 10 retains, treats the NMS 30 as having a setting authority of the line service. In contrast, if these authentication codes do not coincide with one another, the NMS 30 is treated as not having a setting authority of the line service.

Because in the examples shown in FIG. 7 and FIG. 8 the authentication codes that the NMS 30-1 and the NE 10-1 retain coincide with one another, the NMS 30-1 has a setting authority concerning Service 1. In contrast, as for Service 2 and Service N, the NMS 30-1 does not have setting authorities concerning these line services because the authentication codes do not coincide with one another.

[Explanation of Operation]

Next, an operation of the communication system according to the first example embodiment will be described.

<Addition of Line Service from NMS 30>

Figure 9:
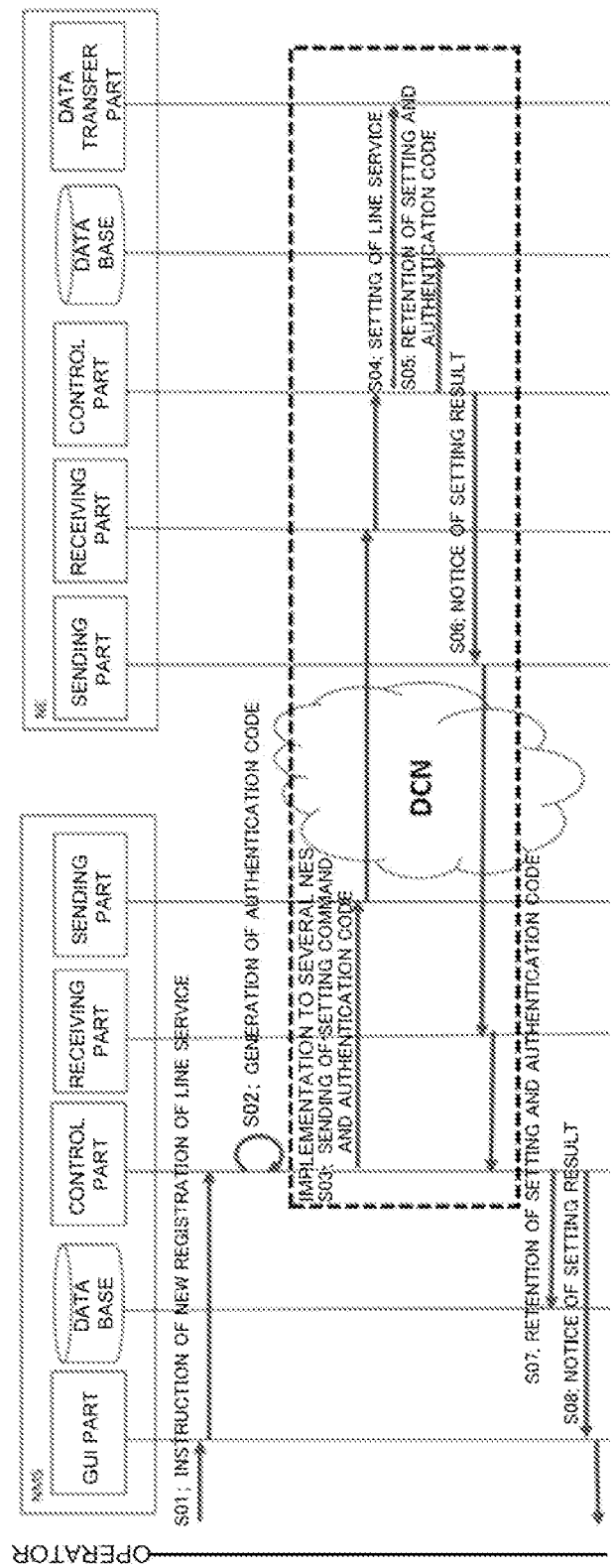
FIG. 9 is a sequence diagram illustrating an operation when NMS adds a new line service.

FIG. 9 is a sequence diagram illustrating an operation when the NMS 30 adds a new line service. An operator (a system manager) selects (determines) an NMS 30 which manages a line service from a plurality of NMSs 30, and inputs information, specification etc. concerning a newly provided (set) line service into the selected NMS 30. For example, the operator designates NE 10 forming a line service (forming a transmission path) and instructs addition of the line service.

In Step S01, the control part 202 of the NMS 30 receives an instruction of addition of a new line service through the GUI part 201 from the operator. The control part 202 produces a command for a line service setting for each NE 10 in which the added line service is involved. The line service setting command is sent to the NE 10 of the setting destination via the sending part 204.

Upon addition of the line service, the authentication code management part 211 generates a random character string as an authentication code of the line service entry (Step S02).

The authentication code is imparted to a setting command the control part 202 produces (sent to the NE 10 of the setting destination). That is, the setting command containing the authentication code is sent to the NE 10 via the sending part 204 (Step S03).

The control part 302 of the NE 10, when it receives the setting command via the receiving part 305, performs setting of the line service to the data transfer part 301 (Step S04).

Then, the control part 302 stores the setting information of the line service and the authentication code in the data base 303 (Step S05). Namely, the control part 302 updates the line service table of the data base 303 according to the contents included in the setting command obtained from the NMS 30.

The control part 302 notifies a setting result to the NMS 30 via the sending part 304 (Step S06). For example, in a case where setting of a line service has been normally finished, the control part 302 sends contents (line service setting, authentication code) registered in the data base 303 together with a positive response (acknowledgment) which means "completion of setting" to the NMS 30 which has sent the setting command to the own apparatus (own NE).

Further, the control part 302 notifies not only the NMS 30 which has sent the setting command to the own apparatus (own NE) but also other NMS(s) 30 included in the communication system that a line service entry has been added to its own data base 303. Because thereupon it is necessary to conceal the authentication code from the other NMS(s) 30, information concerning the authentication code is contained in the setting result notice (data base change notice) to the other NMS(s) 30.

Specifically, the control part 302 sends information retained in the line service table from which "authentication code" is excluded, as "setting result notice", to NMS(s) 30 other than the NMS 30 which has sent the setting command thereto. It is to be noted that details of the above operation notifying the change contents of the NE 10 to the other NMS(s) 30 will be described at <Take-in of a line service setting in NMS> as mentioned below.

Upon receiving the setting result via the receiving part 205, the control part 202 of the NMS 30 stores the line service setting and the authentication code in the data base 203 (Step S07). That is, the data base 203 is updated based on the setting result notice received from the NE 10.

On this occasion, usually, "NE setting completed" is set to the relevant NE setting field. In contrast, if a NE control failed due to a failure of DCN etc., "NE unset" is set to the NE setting field.

The control part 202 notifies the setting result to the operator via the GUI part 201 (Step S08).

It is to be noted that the NMS 30 refers to the line service table when it receives an instruction of newly setting a line service from the operator and obtains details of the line service. Then, the NMS 30 checks whether the line service which it is instructed to newly set has been already present in the communication system. For example, in the case shown in FIG. 7, the NMS 30-1, if it is instructed to add a new line service as "Service 2", judges that this line service is an existing line service managed by the other NMS 30 and notifies that effect to the operator.

<Change of Setting of Line Service from NMS 30>

Figure 10:
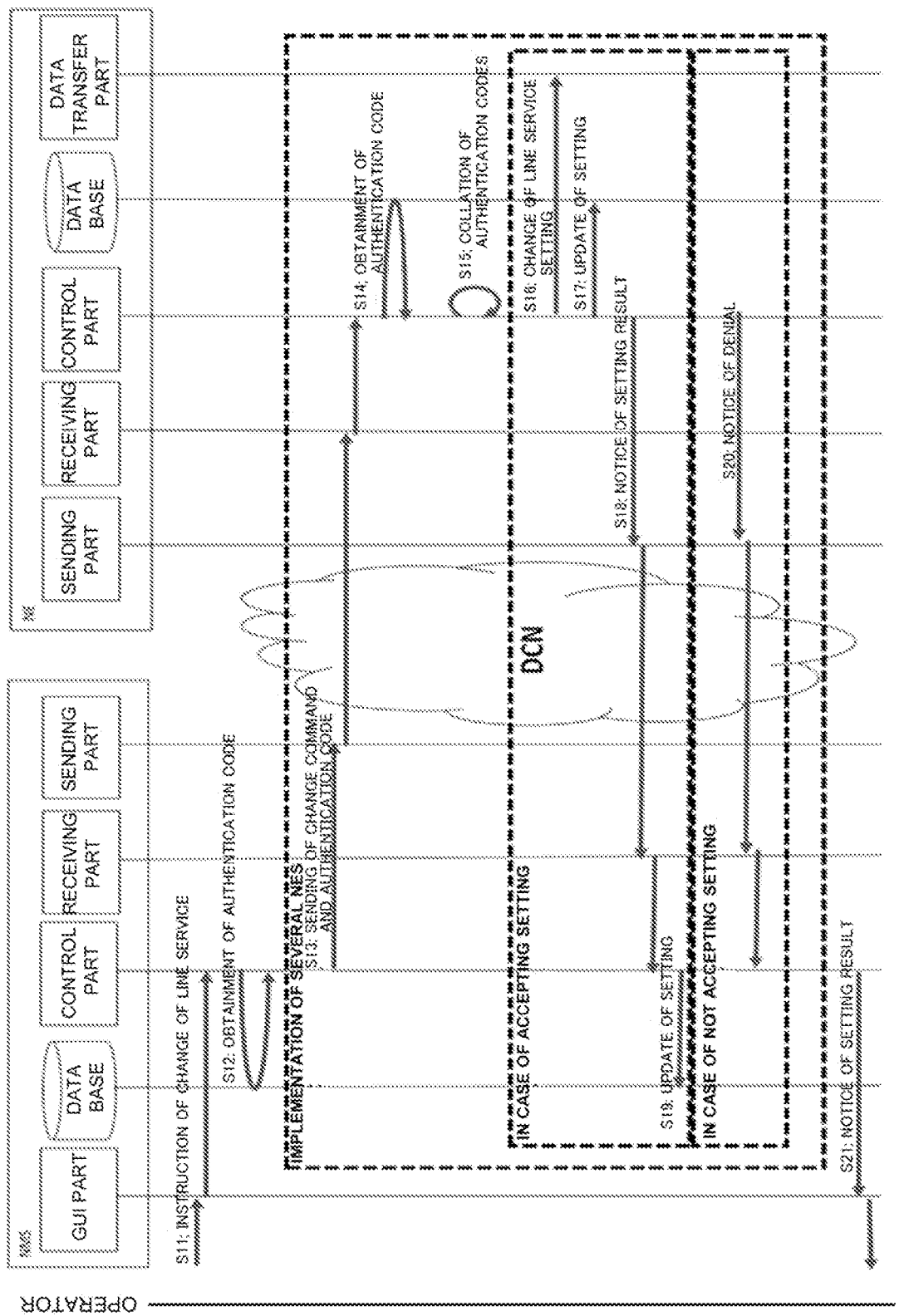
FIG. 10 is a sequence diagram illustrating an operation when NMS performs a setting change.

FIG. 10 is a sequence diagram illustrating an operation when the NMS 30 performs setting change of the line service. The operator instructs the NMS 30 managing the respective line service to change the contents of the previously set line service.

The control part 202 of the NMS 30 receives a setting change instruction (contents of change, line service setting after change) of the line service from the operator via the GUI part 201 (Step S11). The control part 202 generates a command of a line service change for each NE in which the line service to be changed is involved and sends the change command to the NE 10 of the setting destination via the sending part 204.

When producing a setting command, the authentication code management part 211 reads an authentication code out from the data base 203 (Step S12). The read-out authentication code is given to a command of line service change. That is, the change command containing the authentication code is sent to the NE 10 via the sending part 204 (Step S13).

The control part 302 of the NE 10 receives the change command via the receiving part 305. In response to the reception of the change command, the authentication part 311 retrieves the entry of the line service setting contained in the received change command from its own data base 303 and obtains the authentication code of the entry (Step S14). Concretely, the authentication part 311 uses the line service name of the received change command as a key to retrieve the line service table. With the retrieval, the entry corresponding to the received change command is identified and the authentication part 311 obtains the relevant authentication code.

After that, the authentication part 311 performs collation of the authentication code of the obtained entry and the authentication code contained in the change command (Step S15).

In a case of the collation result being "coincidence (matching)", the authentication part 311 accepts the change of the entry.

In a case of accepting the setting change, the control part 302 changes the setting of the data transfer part 301 by the contents (line service setting) of the received change command (Step S16).

Further, the control part 302 updates the data base 303 (Step S17), followed by notifying the setting result to the NMS 30 of the sending origin of the change command via the sending part 304 (Step S18).

When receiving the setting result via the receiving part 205, the control part 202 of the NMS 30 updates the data base 203 by the setting result (Step S19).

Furthermore, the control part 302 notifies via the sending part 304 to different NMS(s) 30 other than the NMS 30 which has instructed the update/change that the line service entry on the data base 303 of the own apparatus (own NE) has been changed (sends a setting result notice). Specifically, the line service name and the line service setting are notified to the NMS(s) 30 as is the case of the new addition of line service. It is to be noted that also in this case, the notice of changing the data base 303 does not contain an authentication code.

In a case of the collation result being "noncoincidence", the authentication part 311 does not accept the change of the entry. In a case where the authentication part 311 does not accept the setting change, the control part 302 notifies "denial (rejection)" as a setting result to the NMS 30 via the sending part 304 (Step S20). The reason that it does not accept the change of the entry in the case of the collation result being "noncoincidence" is that it cannot judge that it has received the change command from the NMS 30 which manages the entry. Namely, NE 10 rejects an instruction of a change from NMS 30 which does not have an authority concerning a setting change of a line service.

In a case where NE control failed due to failure of DCN etc. (e.g. in a case of not receiving the setting result in Step S18), the control part 202 updates the NE setting field in the line service table to "NE unset". For example, the control part 202 sets "NE unset" to the NE setting field in a case where it cannot receive "setting result notice" from the NE 10 although a predetermined period since it sent a change command has elapsed.

The control part 202 notifies the setting result to the operator through the GUI part 201 (Step S21).

As described above, the NMS 30, when it performs the setting change concerning the line service of the NE 10 as management object, sends to the NE 10 as management object the change command containing the setting concerning the line service after the change and the authentication code generated for the NE 10 as management object (Step S13). The NE 10 as management object accepts the change concerning the line service of the own apparatus (own NE) in a case where the previously notified authentication code coincides with the authentication code contained in the change command (Steps S15 to S17).

<As to Line Service Setting from LCT 20>

In a case where, for example, NE 10 cannot be managed from NMS 30 due to failure of DCN etc., the system manager (operator) conducts required management of the NE 10 (maintenance of line service) using the LCT 20. On this occasion, the operator uses a line service setting file.

Addition or change of a line service setting to/in the NE 10 from the LCT 20 is performed using a file (line service setting file) describing a setting of a line service and change contents. The line service setting file contains "NE 10 of setting object", "setting contents of line service" and "authentication code of line service".

The line service setting file is encrypted using a setting file encryption key corresponding to NE 10 of object of (to be subjected to) setting change etc. The line service setting file is a file generated by NMS 30. For example, the operator instructs generation of a line service setting file to NMS 30 and obtains a line service setting file from the NMS 30.

Then, the operator inputs the obtained line service setting file into the LCT 20 using GUI provided by the GUI part 401 of the LCT 20. After that, the control part 402 of the LCT 20 updates the NE 10 by the contents of the obtained line service setting file.

<Output of Line Service Setting File by NMS 30>

Figure 11:
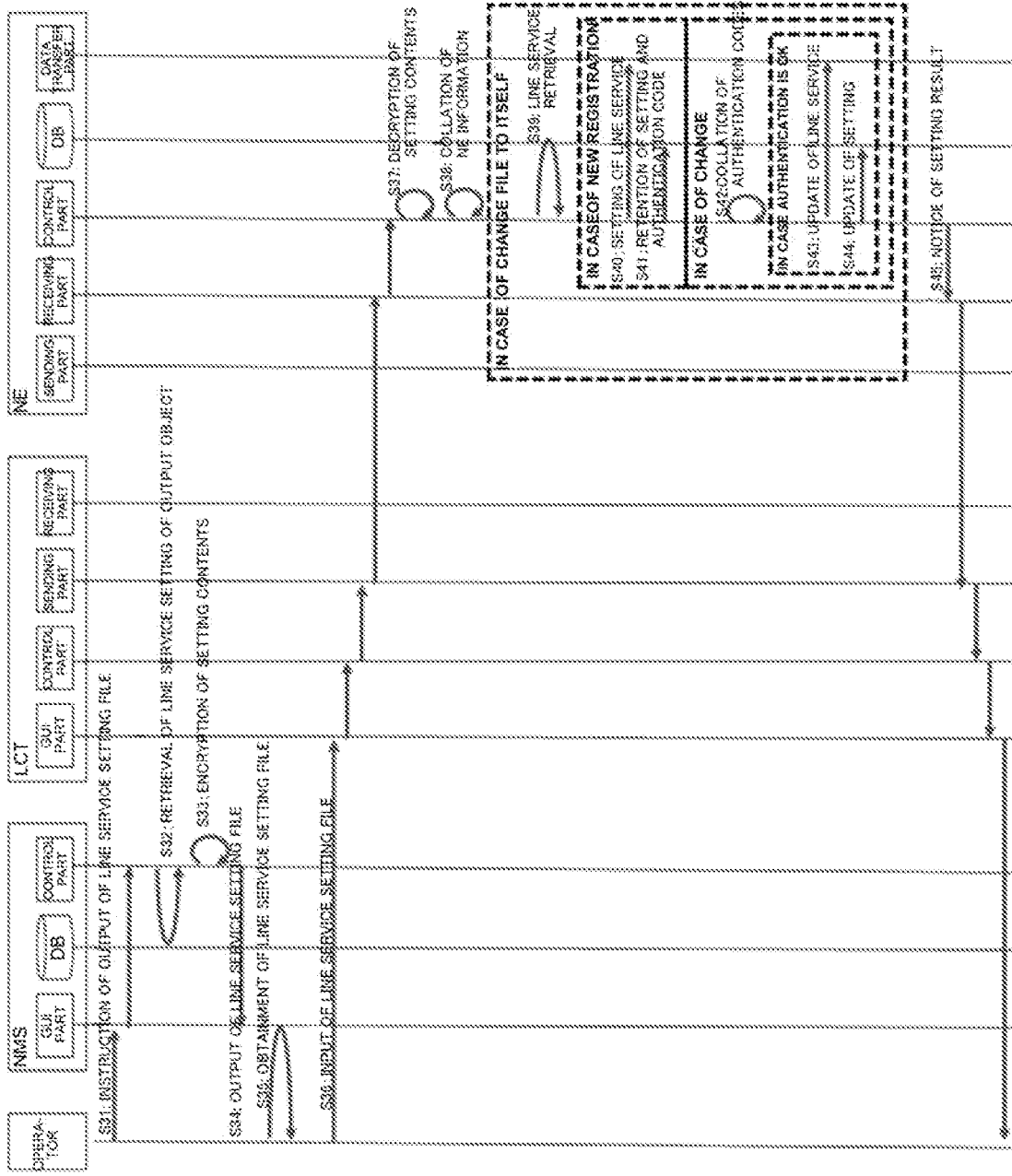
FIG. 11 is a sequence diagram illustrating a series of operations that NMS outputs a line service setting file, and registration and change of a line service setting from LCT are performed.

FIG. 11 is a sequence diagram illustrating a series of operations in which NMS 30 outputs a line service setting file and registration and change of a line service setting from LCT 20 are performed. The line service setting file is provided by a line service setting file output function of the NMS 30.

The setting file generation part 212 (the control part 202) of the NMS 30 receives an output instruction of the line service setting file from the operator via the GUI part 201 (Step S31).

The setting file generation part 212 reads out a corresponding line service setting from the line service table using the line service name and the name of the NE 10 designated by the operator (Step S32).

Then, the setting file generation part 212 encrypts the name of the NE 10 of setting object, the read-out line service setting etc. using a setting file encryption key of the relevant NE 10 (Step S33).

The encrypted file (line service setting file) is provided to the operator through the GUI part 201 (Steps S34, S35).

It is to be noted that in the disclosure of the present application a line service and NE 10 which can be designated by an operator is restricted to a line service and NE 10 in a condition of "NE unset". The reason is that it is unnecessary to change a line service setting of "NE setting completed" from LCD 20.

As described above, in response to the request from the outside, the NMS 30 generates the line service setting file containing the change concerning the line service of the NE 10 as management object and the authentication code generated for the NE 10. Further, the NMS 30 encrypts the line service setting file and outputs the encrypted one to the outside.

<Line Service Setting from LCT 20>

The operator inputs the line service setting file into the control part 402 via the GUI part 401 of the LCT 20 (Step S36). The control part 402 sends (transfers) the line service setting file to the NE 10 via the sending part 403. Namely, the LCT 20 inputs the line service setting file into the NE 10.

Upon receiving the line service setting file via the receiving part 305, the control part 302 of the NE 10 decrypts it using a setting file encryption key of the own apparatus (own NE) (Step S37).

Then, the control part 302 checks whether or not the object NE 10 contained in the line service setting file is the own apparatus (own NE) (Step S38; NE information collation).

If the object NE 10 is the own apparatus (own NE), the control part 302 retrieves the line service table (Step S39) and checks whether or not the line service written in the line service setting file has been registered.

If the relevant line service has not been registered, the control part 302 performs a new setting of a line service as is the case of the new line service setting request from the NMS 30 (Step S40).

Further, the setting contents and the authentication code are stored (saved) (Step S41).

If the relevant line service has been registered, the control part 302 performs a setting change of the line service as is the case of the line service change request from the NMS 30.

Concretely, collation of the authentication codes is performed (Step S42) and if the collation result is "coincidence", the setting contents of the line service and the data base 303 are updated (Steps S43, S44).

After the setting has been completed, the control part 302 notifies the setting result to the LCT 20 via the sending part 304 (Step S45).

Further, the control part 302 notifies all the NMSs 30 included in the communication system that the line service setting in the data base of the own apparatus (own NE) has been changed. The notice of the change concerning the data base 303 does not include the(an) authentication code.

It is to be noted that if in Step S38 the object NE 10 of the line service setting file is not the own apparatus (own NE), the control part 302 notifies "denial" as a setting result to the LCT 20.

Upon receiving the setting result via the receiving part 404, the control part 402 of the LCT 20 notifies the setting result to the operator via through the GUI part 401.

It is to be noted that an operator can obtain a line service setting file in an arbitrary way. For example, an operator may handle NMS 30 in the data center and move to the station after obtaining a line service setting file. On the occasion, the operator may store the line service setting file in a USB (Universal Serial Bus) memory etc. and move between the data center and the station. Alternatively, the operator may obtain the file from another operator (may have the file sent by means of a second communication measure such as e-mail etc.).

As described above, the NE 10 judges whether or not to accept the change concerning the line service of the own apparatus (own NE), by using the authentication code contained in the line service setting file. In a case of accepting the change concerning the line service of the own apparatus (own NE) thereupon, the NE 10 notifies the setting result concerning the line service of the own apparatus (own NE) to each of the plurality of NMSs 30. However, the NE 10 does not notify the previously notified authentication code to the other NMS(s) 30 than the NMS among the plurality of NMSs 30 which has set the line service to the own apparatus.

<Deletion of Line Service Setting from NMS 30, LCT 20>

A flow in a case where an operator deletes the setting of the existing line service using NMS 30 or LCT 20 is the same as in the setting change of the line service. In this case, the setting of the relevant line service is deleted from the data transfer part 301 and the data base 303 only in a case where the authentication part 311 of the NE 10 collates the authentication codes and accepts the deletion.

<Take-In of a Line Service Setting in NMS 30>

In order to achieve synchronization of a line service setting between NMS 30 and NE 10, the NMS 30 has a function of taking in (fetching) the line service setting stored in the data base 303 of the NE 10 into the data base 203 of the own apparatus (own NE).

Figure 12:
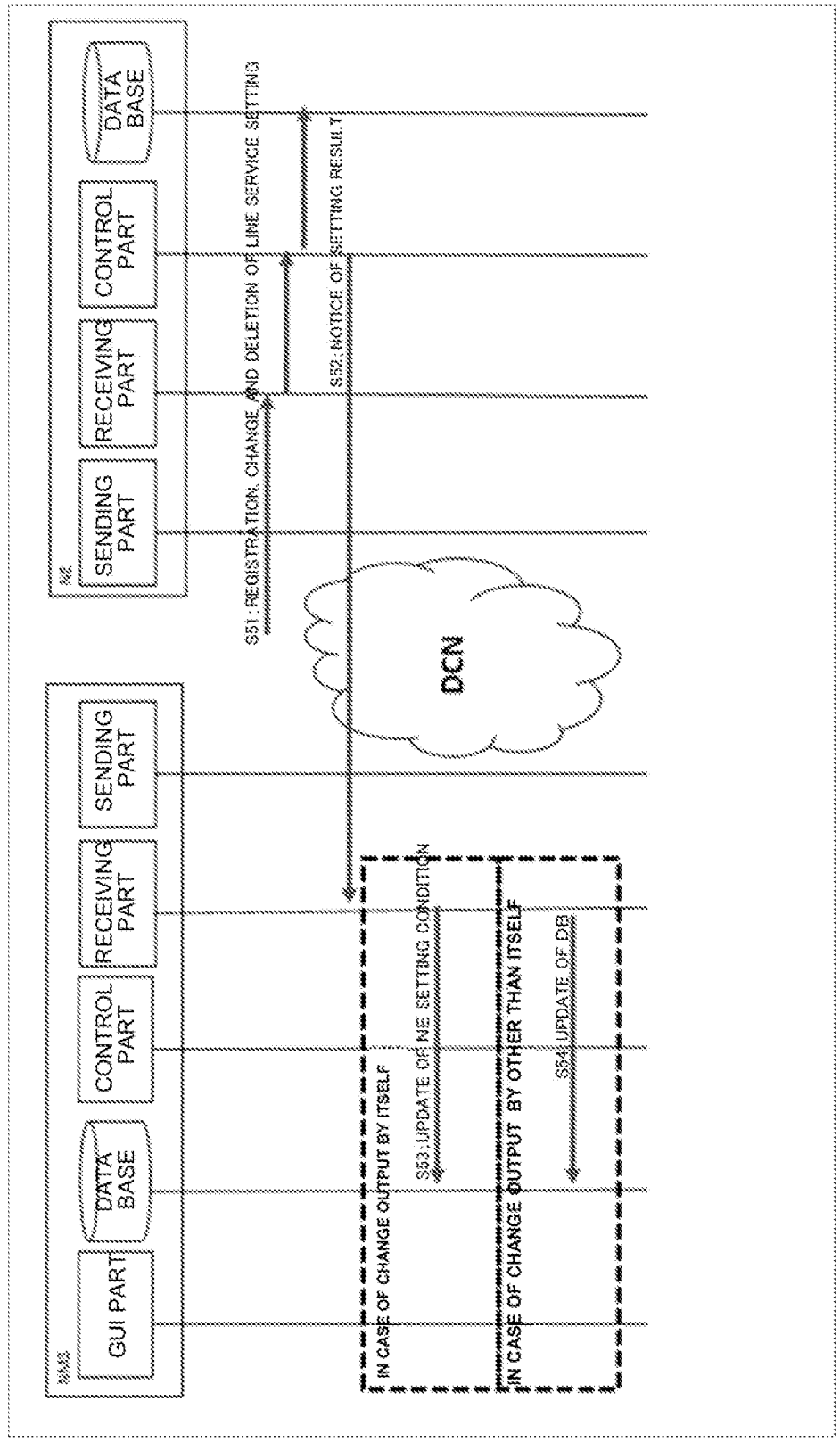
FIG. 12 is a sequence diagram illustrating an operation when a setting of NE is incorporated.

FIG. 12 is a sequence diagram illustrating an operation when taking in a setting of NE 10. It is to be noted that operations as to Step S51 (registration, change, deletion of a line service setting) and Step S52 (setting result notice, data base change notice) shown in FIG. 12 can be the same as the already explained ones and thus explanations thereof are omitted.

Upon receiving the setting result notice (data base change notice) from the NE 10 via the receiving part 205, the control part 202 of the NMS 30 updates the line service table according to the line service setting contained in the change notice. If on the occasion the contents of the data base change of the NE 10 come from the line service setting file outputted by the own apparatus (own NE), the control part 202 updates the NE setting condition in the line service table to "NE setting completed" (Step S53).

If the contents of the change of the data base comes from the line service setting file outputted by NMS 30 other than the own apparatus (own NE), the control part 202 sets an empty string (no change authority) to the authentication code field. Further, on this occasion, the control part 202 sets "NE setting completed" to the NE setting field. In this way, the control part 202 takes in the line service setting of the NE 10 into the data base 203 (updates the data base; Step S54).

It is to be noted that as to judgment of whether a data base update of NE 10 comes from a line service setting file of the own apparatus or a line service setting file of another device, each NMS 30 makes this judgment by checking a line service name of a setting result notice sent from the NE 10. Concretely, if receiving a data base update notice of the same line service as the line service for which an authentication code is set in the line service table stored in the data base 203, the control part 202 judges that this update comes from the line service setting file of the own apparatus.

It is to be noted that instead of performing synchronization of setting between NE 10 and NMS 30 in response to the data base change notice from the NE 10, this synchronization may be done by an operator's instruction.

As described above, each of the NMSs 30, if a notice of a setting result received from NE 10 comes from a line service setting file outputted by the own apparatus (own NE), treats a setting of a line service concerning this NE 10 as completed. Further, each of the plurality of NMSs 30, even if a notice of a received setting result comes from a line service setting file outputted by other apparatus than the own apparatus (own NE), treats a setting of a line service concerning this NE 10 as completed. By responding in this way, NMS 30, even if it does not have an authority, can take in a line service setting set to each NE 10 into a data base 203 of the own apparatus (own NE). Further, by taking in the line service, NMS 30 can check whether or not its line service overlaps with a line service(s) managed by other NMS(s) 30.

Hardware configuration of each apparatus described in the above example embodiment will be described.

[Hardware Configuration]

Figure 13:
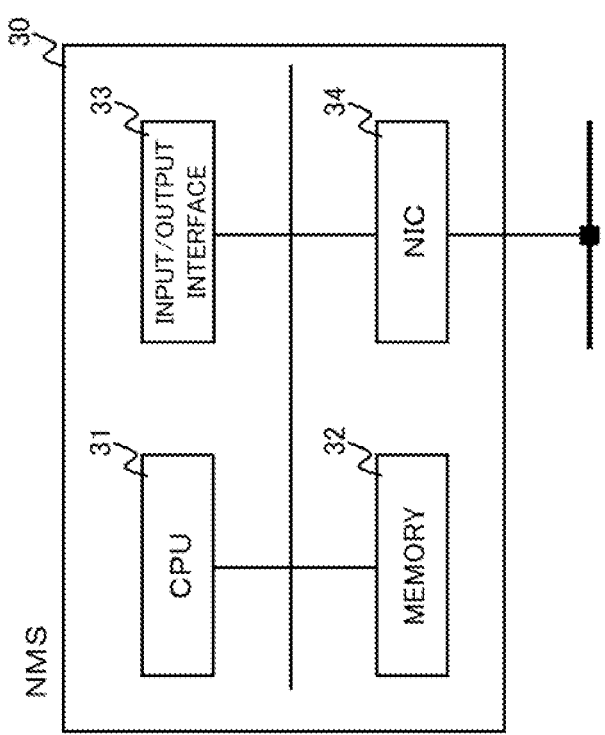
FIG. 13 is a diagram illustrating a hardware configuration of NMS.
Figure 14A:
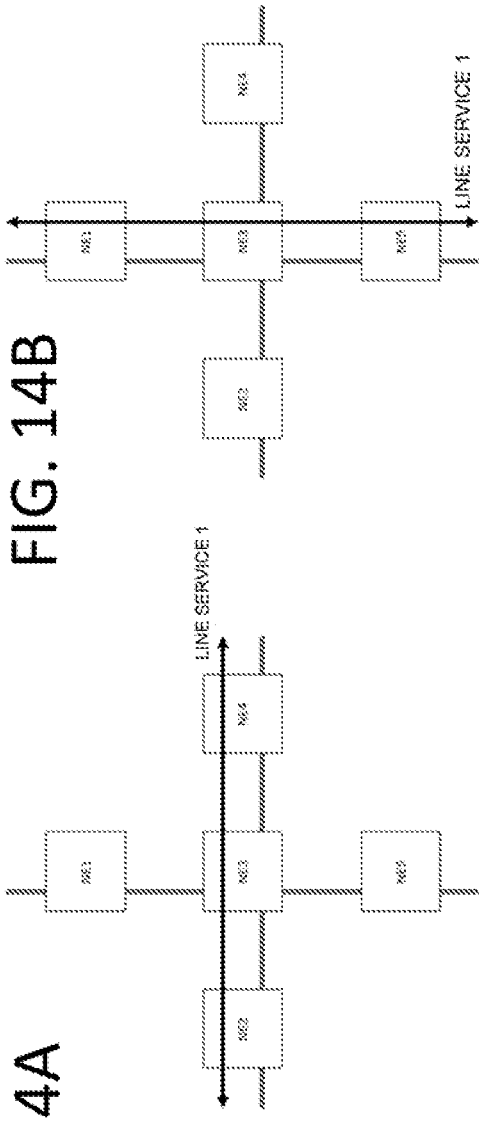
FIGS. 14A to 14C are diagrams for explaining problems of a communication system.
Figure 14B:
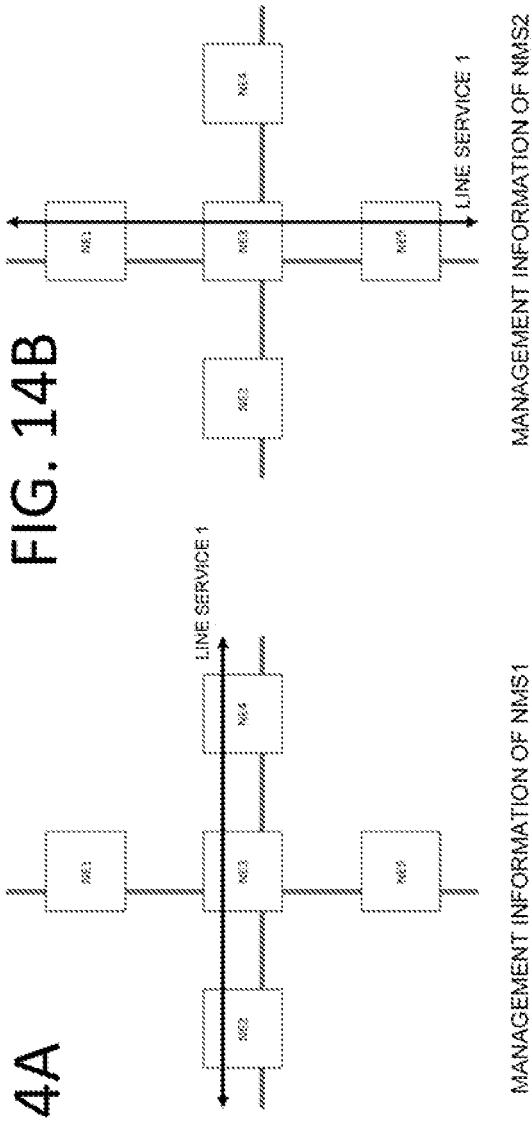
Figure 14C:
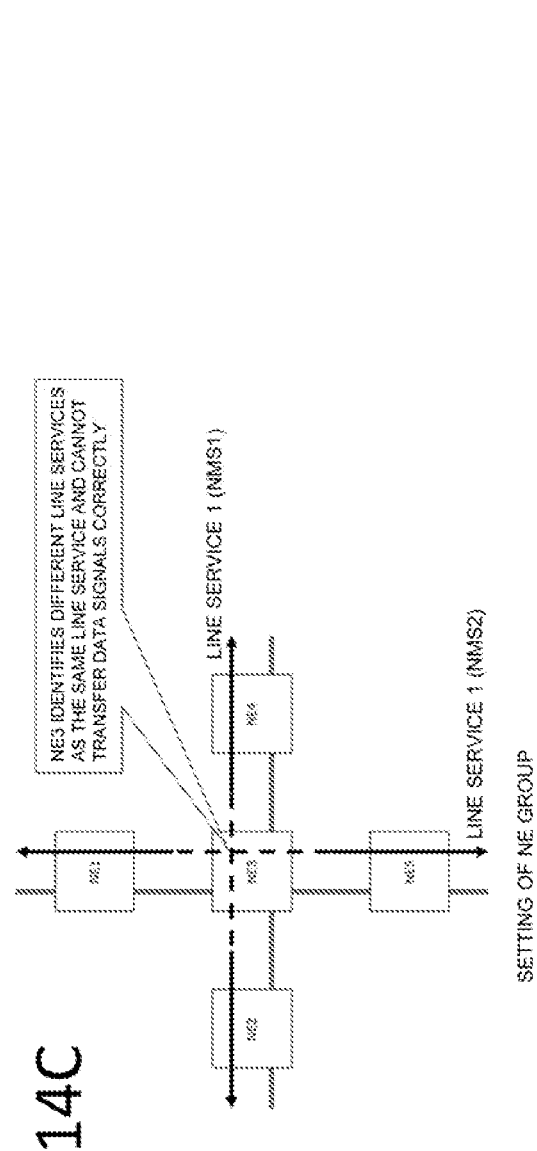
Figure 15:
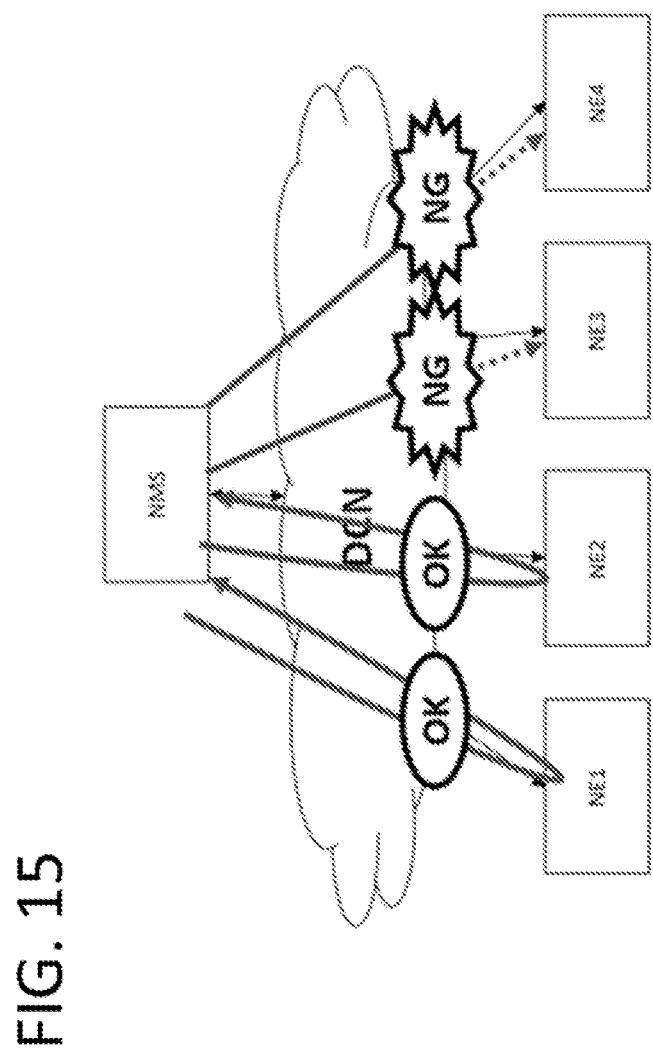
FIG. 15 is a diagram for explaining problems of a communication system.

FIG. 13 is a diagram illustrating a hardware configuration of NMS 30. The NMS 30 is implemented by a so-called computer and comprises the configuration exemplified in FIG. 13. For example, the NMS 30 comprises CPU (Central Processing Unit) 31, a memory 32, an input/output interface 33 and NIC (Network Interface Card) 34 which is a communication interface, etc.

However, the configuration shown in FIG. 13 is not intended to restrict hardware configuration of the NMS 30. The NMS 30 may include hardware not shown in the figure. Also, it is not intended that the numbers of CPU etc. included in the NMS 30 are restricted to those exemplified in FIG. 13, and thus, for example, a plurality of CPUs 31 may be included in the NMS 30.

The memory 32 is RAM (random Access Memory), ROM (Read Only Memory), or an auxiliary storage device (hard disk etc.) etc.

The input/output interface 33 is an interface of an input/output device not shown. The input/output device includes, for example, a display device, a manipulation device etc. The display device is, for example, a liquid crystal display etc. The manipulation device is, for example, a keyboard, a mouse etc.

The function(s) of the NMS 30 is achieved by a module which executes the process(es) as described above. The module is achieved, for example, by that the CPU 31 executes a program stored in the memory 32. Further, the program can be updated by downloading via a network or using a storage medium storing a program(s). Furthermore, the above processing module may be implemented by a semiconductor chip. That is, a function(s) executed by the above processing module may be achieved by some hardware or by software executed using hardware.

It is to be noted that basic hardware configurations of the other apparatuses (NE 10 and LCT 20), too, can be the same as NMS 30 and are self-explanatory to a skilled person, and thus explanations thereof are omitted.

As mentioned above, in the first example embodiment, an authentication code (authentication information) specific to an individual line service unit is set and authority of change of the line service is managed using this authentication code between NMS 30 and NE(s) 10. As a result, it is possible to prevent inconsistency in settings of line services in the whole communication system. That is, the communication system according to the first example embodiment implements management of authority over a line service for an individual NMS 30 in order to prevent inconsistency in the whole system.

Further, NMS 30 generates a line service setting file and inputs the file into NE 10 via LCT 20. As a result, even if a failure of DCN occurs, it is possible to change a line service via LCT 20 without causing inconsistency between 845 settings in the whole system. Furthermore, upon newly registering a line service in NE 10, NMS 30 automatically generates a random character (letter) string(s) and manages the same as an authentication code(s). As a result, it is possible to manage authority over change of a line service between NMS 30 and NE(s) 10 without an operator taking care of an authentication code.

Moreover, in the first example embodiment, a setting change of a line service via LCT 20 without presenting an authentication code to an operator is achieved by encrypting a line service setting file and exchanging the encrypted one between apparatuses. As a result, a possibility of an authentication code leaking out to a third party is reduced and system security is ensured. It is to be noted that it might be assumed to transfer in advance an authority over a setting change to LCT 20 before occurrence of a failure of DCN, however, such a measure is not desirable. Transferring an authority over a setting change to LCT in advance results in that a plurality of subjects can change a setting of NE 10, which could lead to an occurrence of inconsistency of settings. In addition, it is not desirable to transfer an authority over a setting change to LCT 20 in advance, also in light of security of the communication system.

Further, setting changes which can be done from LCT 20 can be minimized by incorporating setting contents into a line service setting file.

VARIATIONS

The configuration etc. of the communication system described in the above example embodiment are merely exemplified and are not intended to restrict configuration of the system. For example, it is possible to implement management of authority over a line service setting for an individual user (on a user basis) or for an individual group (on a group basis). In this case, for example, an authentication code on a user basis may be given to an individual NE 10.

Furthermore, the aforementioned example embodiment has been described on the premise that a common encryption key is distributed to NMS 30 and NE(s) 10 but different encryption keys may be distributed to different apparatuses. For example, a secret (private) key may be distributed to NMS 30 and a corresponding open (public) key may be distributed to NE 10. Arbitrary keys with which NE 10 can decrypt a line service setting file encrypted by NMS 30 may be used.

From the above description, the industrial applicability of the present invention is evident. The present application can be suitably applied to a wide variety of network elements (transmission apparatuses) and NMSs managing line services provided by network elements, such as a VLAN switch, a router apparatus, a VPN (Virtual Private Network) apparatus etc. as well as a cross connection apparatus.

A portion or the entire of the aforementioned example embodiments can be recited as the following supplementary notes, but not restricted thereto.

[Supplementary Note 1]

This is the communication system according to the first aspect described above.

[Supplementary Note 2]

A communication system, preferably stated in Supplementary Note 1, wherein the management apparatus is configured such that, when performing a setting change concerning a line service of the network element(s) as management object, it sends a change command comprising a setting concerning a line service after the change and an authentication code generated for the network element(s) as management object to the network element(s) as management object, and the network element(s) as management object is configured to accept the change concerning the line service of the own apparatus (own network element) if the notified authentication code and the authentication code included in the change command coincide with each other.

[Supplementary Note 3]

A communication system, preferably stated in Supplementary Note 1 or 2, further comprising a terminal(s) connected with the network element(s) as management object, wherein the management apparatus is configured to generate, in response to an external request, a line service setting file containing the change concerning the line service of the network element(s) as management object and the authentication code generated for the network element(s) as management object, the terminal(s) is configured to input the line service setting file into the network element(s) as management object, and the network element(s) as management object is configured to judge, by using the authentication code contained in the line service setting file, whether or not to accepts the change concerning the line service of the own apparatus (own network element).

[Supplementary Note 4]

A communication system, stated in Supplementary Note 3, wherein it comprises a plurality of the management apparatuses, and the network element(s) as management object is configured such that, if it accepts the change concerning the line service of the own apparatus (own network element), it notifies a result of setting concerning the line service of the own apparatus (own network element) to each of the plurality of management apparatuses.

[Supplementary Note 5]

A communication system, stated in Supplementary Note 4, wherein the network element(s) as management object is configured not to notify the notified authentication code to the other management apparatus(es) than the management apparatus, which has set the line service to the own apparatus (own network element), among the plurality of management apparatuses.

[Supplementary Note 6]

A communication system, stated in Supplementary Note 5, wherein each of the plurality of management apparatuses is configured to treat the setting of the line service concerning the network element(s) as management object as completed, if the notice of the setting result comes from the line service setting file outputted by the own apparatus (own network element).

[Supplementary Note 7]

A communication system, stated in Supplementary Note 5 or 6, wherein each of the plurality of management apparatuses is configured to treat the setting of the line service concerning the network element(s) as management object as unset, if the notice of the setting result comes from the line service setting file outputted by other apparatus than the own apparatus (own network element).

[Supplementary Note 8]

A communication system, stated in any one of Supplementary Notes 3 to 7, wherein the management apparatus is configured to encrypt the line service setting file and output the encrypted one to the outside.

[Supplementary Note 9]

A communication system, stated in any one of Supplementary Notes 1 to 8, wherein the network element(s) and the management apparatus are connected with one another via a data communication network.

[Supplementary Note 10]

This is the method of changing a setting according to the second aspect described above.

[Supplementary Note 11]

A management apparatus configured to be connected with a plurality of network elements (transmission apparatuses) each of which is configured to transfer a data signal(s), manage a line service provided by a network element as management object (a network element to be managed) among the plurality of network elements, and generate an authentication code corresponding to the network element as management object as well as notify the generated authentication code to the network element as management object.

[Supplementary Note 12]

A program allowing a computer installed on a management apparatus which is connected with a plurality of network elements, each of which transfers a data signal(s), and manages a line service provided by a network element as management object among the plurality of network elements, to execute:

a process generating an authentication code corresponding to the network element as management object, and a process notifying the generated authentication code to the network element as management object.

It is to be noted that this program can be recorded in a computer-readable storage medium. The storage medium may be (non-transitory) one such as a semiconductor memory, a hard disk, a magnetic record medium, an optical record medium etc. The present invention can be implemented as a computer program product, too.

It is to be noted that the embodiments of Supplementary Notes 10 to 12 can be developed to the example embodiments of Supplementary Notes 2 to 9 as is the case of the example embodiment of Supplementary Note 1.

It is to be noted that the disclosure of the abovementioned Patent Literature is incorporated herein by reference thereto. Modifications and adjustments of the example embodiments and the examples may be made within the scope of the entire disclosure (including the scope of the Claims) of the present invention, and also based on the fundamental technical concept thereof. Various combinations and selections (including partial deletions) of various disclosed elements (including individual elements of each claim, individual elements of each example embodiment and example, individual elements of each drawing and the like) are possible within the scope of the entire disclosure of the present invention. That is, it is self-explanatory that the present invention includes various types of transformations and modifications that a person skilled in the art can realize according to the entire disclosure including the Claims and the technical concept thereof. In particular, with regard to the numerical ranges described in the present application, arbitrary numerical values and small ranges included in the relevant ranges should be interpreted to be concretely described even if there is no particular description thereof. Moreover, it is deemed that it is included as a part of the disclosure of the present invention in the disclosed matters of the present application that a portion or the entire of the individual disclosed matters of the above referenced literature are used in combination with the stated matters of this document as required in accordance with the gist of the present invention.

REFERENCE SIGNS LIST 10, 10-1 to 10-4 NE
20, 20-1 to 20-4 LCT (Local Craft Terminal)
30, 30-1,30-2 NMS (Network Management System)
31 CPU
32 memory
33 input/output interface
34 NIC
101 Network Element (NE)
102 management apparatus
201, 401 GUI part
202, 302, 402 control part
203, 303 data base
204, 304, 403 sending part
205, 305, 404 receiving part
211 authentication code management part
212 setting file generation part
301 data transfer part
311 authentication part

What is claimed is:

1. A communication system, comprising:
a plurality of network elements, each of which is configured to transfer a data signal, and
a management apparatus configured to manage a line service provided by a network element as management object among the plurality of network elements, the line service comprising a transmission path between terminals,
wherein the management apparatus comprises a processor and a memory storing instructions executed by the processor, the instructions comprising: generating an authentication code corresponding to the network element as management object and notifying the generated authentication code to the network element as management object, the authentication code indicating that the management apparatus has a change authority of the line service, and
wherein the network element as management object comprises a processor and a memory storing instructions executed by the processor, the instructions comprising: judging, by using the notified authentication code, whether or not to accept a change concerning a line service of the own network element.

2. The communication system according to claim 1, wherein the management apparatus is configured that, when performing a setting change concerning a line service of the network element as management object, it sends a change command comprising a setting concerning a line service after the change and an authentication code generated for the network element as management object to the network element as management object, and
the network element as management object is configured to accept the change concerning the line service of the own network element if the notified authentication code and the authentication code included in the change command coincide with each other.

3. The communication system according to claim 1, further comprising a terminal connected with the network element as management object, wherein
the management apparatus is configured to generate, in response to an external request, a line service setting file containing the change concerning the line service of the network element as management object and the authentication code generated for the network element as management object,
the terminal is configured to input the line service setting file into the network element as management object, and
the network element as management object is configured to judge, by using the authentication code contained in the line service setting file, whether or not to accepts the change concerning a line service of the own network element.

4. The communication system according to claim 3, wherein the system comprises a plurality of the management apparatuses, and
the network element as management object is configured such that, if the network element as management object accepts the change concerning the line service of the own network element, it notifies a result of setting concerning a line service of the own network element to each of the plurality of management apparatuses.

5. The communication system according to claim 4, wherein the network element as management object is configured not to notify the notified authentication code to one or more management apparatus other than the management apparatus, which has set the line service to the own network element, among the plurality of management apparatuses.

6. The communication system according to claim 5, wherein each of the plurality of management apparatuses is configured to treat the setting of the line service concerning the network element as management object as completed, if the notice of the setting result comes from the line service setting file outputted by the own network element.

7. The communication system according to claim 5, wherein each of the plurality of management apparatuses is configured to treat the setting of the line service concerning the network element as management object as unset, if the notice of the setting result comes from the line service setting file outputted by other apparatus than the own network element.

8. The communication system according to claim 3, wherein the management apparatus is configured to encrypt the line service setting file and output the encrypted one to the outside.

9. The communication system according to claim 1, wherein the network element and the management apparatus are connected with one another via a data communication network.

10. A method of changing a setting in a communication system comprising:
 a plurality of network elements, each of which transfers a data signal, and
 a management apparatus that manages a line service provided by a network element as management object among the plurality of network elements, the line service comprising a transmission path between terminals,
 wherein the method comprises:
 generating an authentication code corresponding to the network element as management object and notifying the generated authentication code to the network element as management object, the authentication code indicating that the management apparatus has a change authority of the line service, and
 judging, by using the notified authentication code, whether or not to accept a change concerning a line service.

11. The method according to claim 10, further comprising:
 sending, when performing a setting change concerning a line service of the network element as management object, a change command comprising a setting concerning a line service after the change and an authentication code generated for the network element as management object to the network element as management object, and
 accepting the change concerning the line service of the own network element if the notified authentication code and the authentication code included in the change command coincide with each other.

12. The method according to claim 10, wherein the system further comprises a terminal connected with the network element as management object,
 the method further comprising:
 generating, in response to an external request, a line service setting file containing the change concerning the line service of the network element as management object and the authentication code generated for the network element as management object,
 inputting the line service setting file into the network element as management object from the terminal, and
 judging, by using the authentication code contained in the line service setting file, whether or not to accepts the change concerning a line service of the own network element.

13. The method according to claim 12, wherein the system comprises a plurality of the management apparatuses,
 the method further comprising:
 notifying, if the network element as management object accepts the change concerning the line service of the own network element, a result of setting concerning a line service of the own network element to each of the plurality of management apparatuses.

14. The method according to claim 13, further comprising:
 not notifying the notified authentication code to the other management apparatus(es) than the management apparatus, which has set the line service to the own network element, among the plurality of management apparatuses.

15. The method according to claim 14, further comprising:
 treating, in each of the plurality of management apparatuses, the setting of the line service concerning the network element as management object as completed, if the notice of the setting result comes from the line service setting file outputted by the own network element.

16. The method according to claim 14, further comprising:
 treating, in each of the plurality of management apparatuses, the setting of the line service concerning the network element as management object as unset, if the notice of the setting result comes from the line service setting file outputted by other apparatus than the own network element.

17. The method according to claim 12, further comprising:
 encrypting the line service setting file, and
 outputting the encrypted one to the outside.

18. A management apparatus configured to be connected with a plurality of network elements each of which is configured to transfer a data signal, wherein the management apparatus comprises: a memory and a processor coupled with the memory, wherein the processor is configured to manage a line service provided by a network element as management object among the plurality of network elements, the line service comprising a transmission path between terminals, and generate an authentication code corresponding to the network element as management object, the authentication code indicating that the management apparatus has a change authority of the line service, the authentication code used by the network element as management object to judge whether or not to accept a change concerning a line service of the own network element, as well as notify the generated authentication code to the network element as management object.

19. The management apparatus according to claim 18, wherein the management apparatus is configured that, when performing a setting change concerning a line service of the network element as management object, it sends a change command comprising a setting concerning a line service after the change and an authentication code generated for the network element as management object to the network element as management object.

20. The management apparatus according to claim 18, wherein the management apparatus is configured to generate, in response to an external request, a line service setting file containing the change concerning the line service of the network element as management object and the authentication code generated for the network element as management object.

* * * * *